Patented Feb. 6, 1951

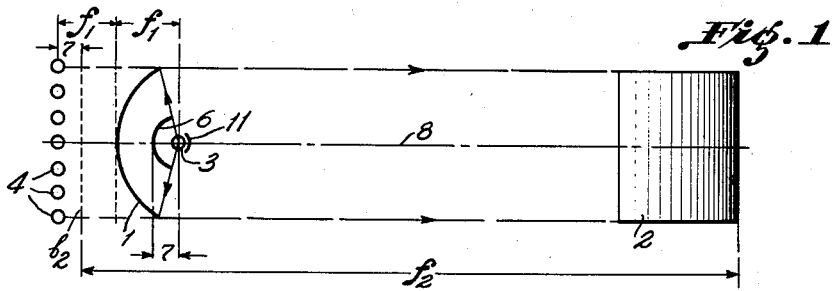
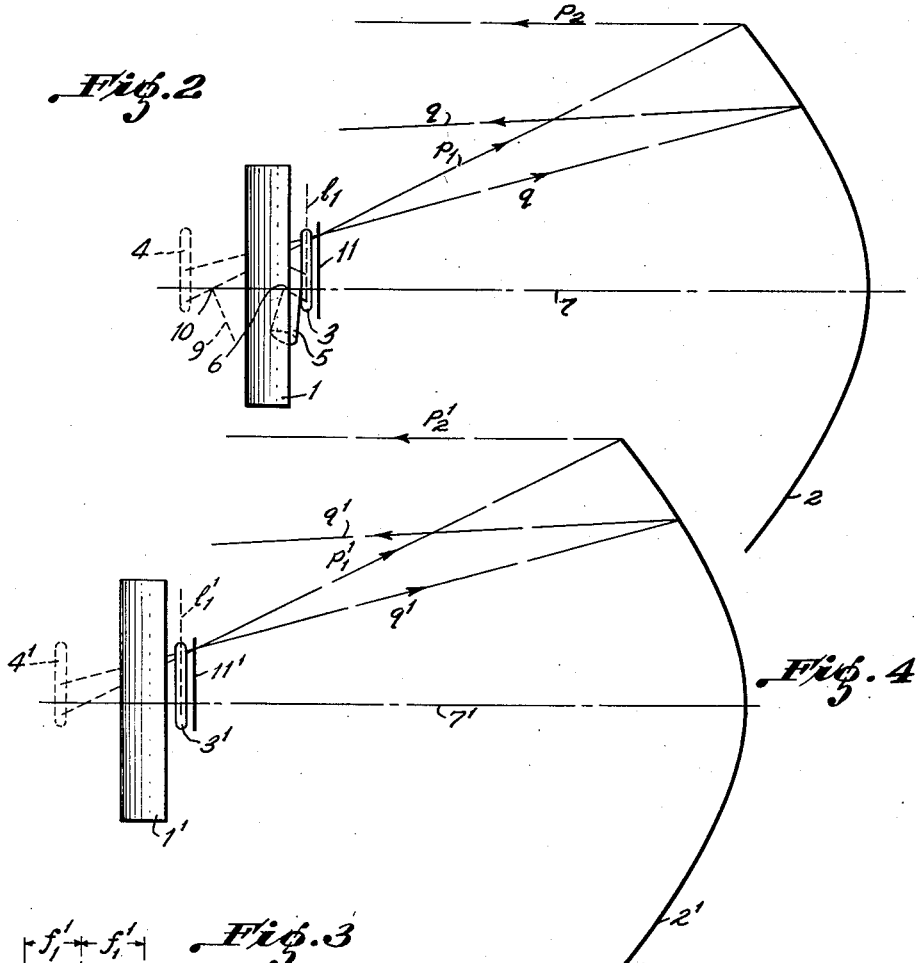
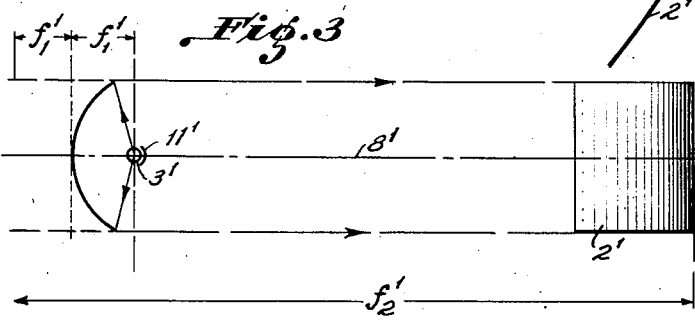

2,540,417

UNITED STATES PATENT OFFICE 2,540,417

SEARCHLIGHT HAVING A LINEAR SOURCE OF LIGHT AND TWO PARABOLIC REFLECTORS

Jan Bergmans and Clamor August Lamberts, Eindhoven, Netherlands, assignors, by mesne assignments, to Hartford National Bank and Trust Company, Hartford, Conn., as trustee Application April 12, 1946, Serial No. 661,553
In the Netherlands March 13, 1943

Section 1, Public Law 690, August 8, 1946
Patent expires March 13, 1963

6 Claims. (Cl. 240—41.1)

Well-known search lights are generally formed by a combination of a reflector, shaped in the form of a portion of a paraboloid of revolution, and a source of light, for example the crater of a carbon arc, arranged at the focus of the said reflector. If, however, with a view to obtaining a higher intrinsic brilliance, use is made of a linear source of light such, for example, as a superhigh-pressure mercury-vapour discharge tube, a satisfactory form of beam is not obtained without supplementary means and even in the use of a parabolic cylindrical reflector, the source of light being arranged in the focal line, a favourable result is not obtained without further precautions.

The search light according to the invention is constituted by a combination of a linear source of light and two parabolic cylindrical reflectors whose focal distances are in the ratio of at least 5:1 and whose active surfaces are turned towards each other, the generatrices of the parabolic cylindrical reflectors crossing each other at right angles and the linear source of light being arranged in the focal line of the parabolic cylindrical reflector having the smaller focal distance. Due to the high disparity between the focal distances of the two reflectors the advantage accrues that only a small part of the light issuing from the reflector having the larger focal distance is intercepted by the reflector having the smaller focal distance. The dispersal of the luminous rays in planes parallel to the axis plane of the reflector having the larger focal distance is determined by the angle at which the diameter of the source of light used for the lighting is viewed from the reflector having the smaller focal distance, whereas the dispersal of the luminous rays in planes parallel to the axis plane of the reflector having the smaller focal distance is determined by the angle at which the length of that part of the source of light which is used for the lighting is viewed from the reflector having the larger focal distance. The axis plane of a parabolic cylindrical reflector is always to be understood to mean here the plane passing through the apex generatrix and the focal line of the said reflector. If, according to one embodiment of the search-light of the invention the focal distances of the two reflectors are in somewhat the same ratio to each other as is the length of the source of light which is used for the lighting to the diameter of this source of light which is used for the lighting, the influence of the linear shape of the source of light is practically compensated for in the formation of the beam. That length of the source of light which is used for the lighting will, for example, equal the spacing of the electrodes of the source of light or, in some cases, equal that part of the spacing which is not screened, in some manner whereas that diameter of the source of light which is used for forming the beam equals the diameter of the discharge path.

The use of a search light, for example, for the observation of aircraft generally has the disadvantage that the beam promotes its maximum lighting intensity at the centre. Due to this, observers are apt to follow the body which it is desired to illuminate, that is to say the aircraft, by means of the said centre. In this case the observer, who is generally not very distant from the search light, is hampered during observation by the dispersed light of the part of the beam away from the centre. This disadvantage will not occur in the use of a beam whose perimeter of the section normal to the course of rays comprises a straight edge portion and which just promotes its maximum lighting intensity at the said straight edge portion. In this case, the aircraft will be followed by means of this edge portion and the observer is not hampered by scattered light.

A preferred embodiment of the search light according to the invention is distinguished by the feature that one of the ends of that length of the source of light which is used for illumination is located in the axis plane of the parabolic cylindrical reflector having the larger focal distance and the spacing of the two parabolic cylindrical reflectors equals the difference of the focal distances, means being provided to prevent direct light from falling on to the parabolic cylindrical reflector having the larger focal distance. As a result of a delimiting of that length of the source of light which is used in this arrangement for illumination in the axis plane of the parabolic cylindrical mirror having the larger focal distance, the beam of light issuing from the search light will actually exhibit a straight edge portion. In the plane of this edge portion the luminous rays have sufficient dispersal to ensure proper observation, since the dispersal is determined by the angle at which the diameter of the source of light is reflected from the reflector having the smaller focal distance. A straight edged beam delimitation of this kind cannot be achieved by means of a parabolic reflector of revolution, even if in such case, as in the described embodiment of the inreflection, either also emerge parallel to the axis plane 7 or be directed towards that axis plane, for example the ray $q$.

The beam issuing from the reflector 2 thus actually exhibits a straight edged delimitation to wit the plane passing through $p_2$ normally to the plane of the drawing of Figure 2, since there are no luminous rays which, after reflection at the reflector 2, are directed away from the axis plane 7. The delimiting plane itself still comprises luminous rays in various directions owing to the dispersion determined by the angle at which the diameter of the source of light 3 is viewed from the reflector 1.

A screen 11 arranged between the reflector 2 and the source of light 3 operates to avoid any interference by direct light on the said reflector 2.

In order to avoid reflection of the light from the source of light off the screen 5, the latter may be constructed so as to be non-reflective or the apical angle of the truncated cone may be such that the light issuing from the source of light according to the delimiting angles does not impinge on the screen.

In the embodiment disclosed in Figures 3 and 4, like elements as those shown in Figures 1 and 2 are designated by primed reference numerals. As will be noted, in this latter embodiment, the screen 5 is omitted. Accordingly, the reflectors 1' and 2' may then be spaced a distance equal to the difference between their focal distances as shown, as the formation of the virtual screen image behind the small reflector 1' is no longer necessary.

What we claim is:

1. A search light constituted by the combination of a linear source of light and two parabolic cylindrical reflectors whose focal distances are in the ratio of at least 5:1 and whose active surfaces are directed towards each other, the generatrices of the parabolic cylindrical reflectors crossing each other at right angles and the linear sources of light being arranged in the focal line of the parabolic cylindrical reflector having the smaller focal distance.

2. A search light as claimed in claim 1, wherein the focal distances of the two reflectors are in somewhat the same ratio as that length of the source of light which is used for the lighting and that diameter of this source of light which is used for the lighting.

3. A search light as claimed in claim 1, wherein one of the ends of that length of the source of light which is used for illumination is located in the axis plane of the parabolic cylindrical reflector having the larger focal distance and the spacing of the two parabolic cylindrical reflectors equals the difference between the focal distances, means being provided to prevent direct light from falling on to the parabolic cylindrical reflector having the larger focal distance.

4. A search light as claimed in claim 1, wherein concentrically to the source of light is arranged a screen of the shape of a surface of revolution one circular edge of which is located in the axis plane of the parabolic cylindrical reflector having the larger focal distance, the spacing of the two parabolic cylinders equalling the difference between the focal distances increased by the radius of the said circular edge of the screen located in the axis plane and means being provided to prevent direct light from falling on to the parabolic cylindrical reflector having the larger focal distance.

5. A search light as claimed in claim 1 wherein the focal distances of the two reflectors are in approximately the same ratio as the length of the light source and the diameter of the light source and wherein one of the ends of the light source is located in the axis plane of the parabolic cylindrical reflector having the larger focal distance and the spacing of the two parabolic cylindrical reflectors is substantially equal to the difference between the focal distances, means being provided to prevent direct light from falling onto the parabolic cylindrical reflector having the larger focal distance.

6. A search light as claimed in claim 1 wherein the focal distances of the two reflectors are in approximately the same ratio as the length of the light source and the diameter of the light source and wherein concentrically to the light source is arranged a screen of the shape of a surface of revolution one circular edge of which is located in the axis plane of the parabolic cylindrical reflector having the larger focal distance, the spacing of the two parabolic cylinders equalling the difference between the focal distances increased by the radius of said edge of the screen located in the axis plane and means being provided to prevent light from falling onto the parabolic cylindrical reflector having the larger focal distance.

JAN BERGMANS.
CLAMOR AUGUST LAMBERTS.

REFERENCES CITED

The following references are of record in the file of this patent:

UNITED STATES PATENTS

| Number | Name | Date |
| --- | --- | --- |
| 1,354,422 | Salt | Sept. 28, 1920 |

FOREIGN PATENTS

| Number | Country | Date |
| --- | --- | --- |
| 336,779 | England | Oct. 23, 1930 |